(12) United States Patent
Ma et al.

(10) Patent No.: US 11,239,957 B2
(45) Date of Patent: Feb. 1, 2022

(54) DATA PROCESSING METHOD AND DATA PROCESSING APPARATUS

(71) Applicant: Huawei Technologies Co., Ltd., Shenzhen (CN)

(72) Inventors: Liang Ma, Shanghai (CN); Chen Zheng, Shanghai (CN); Xiaojian Liu, Shenzhen (CN); Yuejun Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 16/665,750

(22) Filed: Oct. 28, 2019

(65) Prior Publication Data

US 2020/0059329 A1 Feb. 20, 2020

Related U.S. Application Data

(63) Continuation of application No. PCT/CN2018/084156, filed on Apr. 24, 2018.

(30) Foreign Application Priority Data

Apr. 28, 2017 (CN) .......................... 201710295425.3

(51) Int. Cl.
*H04L 1/18* (2006.01)
*H04L 1/00* (2006.01)
(Continued)

(52) U.S. Cl.
CPC .......... *H04L 1/1861* (2013.01); *H04L 1/0057* (2013.01); *H04L 5/0055* (2013.01); *H04W 72/0413* (2013.01)

(58) Field of Classification Search
CPC ... H04L 1/1861; H04L 1/0057; H04L 5/0055; H04L 1/1809; H04L 1/0067;
(Continued)

(56) References Cited

U.S. PATENT DOCUMENTS

2008/0288850 A1 11/2008 Rhee et al.
2018/0278368 A1* 9/2018 Kim ...................... H04L 1/1854
(Continued)

FOREIGN PATENT DOCUMENTS

CN 101667900 A 3/2010
EP 3584977 A1 12/2019

OTHER PUBLICATIONS

"Overview of CBG-based retransmission in NR," 3GPPTSG RAN WG1 Meeting #88bis, Spokane, USA, R1-1705401, pp. 1-4, 3rd Generation Partnership Project, Valbonne, France (Apr. 3-7, 2017).
(Continued)

*Primary Examiner* — Will W Lin
(74) *Attorney, Agent, or Firm* — Leydig, Voit & Mayer, Ltd.

(57) ABSTRACT

This application provides a data processing method and a data processing apparatus. The data processing method includes: determining C code blocks, where C is a positive integer; and dividing the C code blocks into K code block groups, where an absolute value ΔC of a difference between quantities of code blocks included in any two of the K code block groups is less than or equal to a first threshold, and K is a positive integer. The data processing method and the data processing apparatus provided in this application help lower a bit error rate.

17 Claims, 2 Drawing Sheets

(51) Int. Cl.
 *H04L 5/00* (2006.01)
 *H04W 72/04* (2009.01)
(58) Field of Classification Search
 CPC ... H04L 1/0009; H04L 1/0047; H04L 1/0058; H04W 72/0413
 See application file for complete search history.

(56) References Cited

U.S. PATENT DOCUMENTS

2019/0386781 A1* 12/2019 Lin .................. H04W 72/1257
2020/0295873 A1*  9/2020 Jayasinghe ........... H04L 1/0061

OTHER PUBLICATIONS

"Discussion on CBG-based feedback and retransmission," 3GPP TSG RAN WG1 Meeting #88bis, Spokane, USA, R1-1705066, pp. 1-4, 3rd Generation Partnership Project, Valbonne, France (Apr. 3-7, 2017).

"WF on CB-group based retransmission," 3GPP TSG RAN1#88bis, Spokane, USA, R1-1706585, pp. 1-4, 3rd Generation Partnership Project, Valbonne, France (Apr. 3-7, 2017).

* cited by examiner

DATA PROCESSING METHOD AND DATA PROCESSING APPARATUS

CROSS-REFERENCE TO RELATED APPLICATIONS

This application is a continuation of International Application No. PCT/CN2018/084156, filed on Apr. 24, 2018, which claims priority to Chinese Patent Application No. 201710295425.3, filed on Apr. 28, 2017. The disclosures of the aforementioned applications are hereby incorporated by reference in their entireties.

TECHNICAL FIELD

This application relates to the communications field, and more specifically, to a data processing method and a data processing apparatus.

BACKGROUND

In a current communications system, when a receive end checks and finds an error in any code block (CB) in a transport block (TB), the receive end feeds back a negative acknowledgment (NACK) to a transmit end. After receiving the NACK feedback information, the transmit end retransmits the entire TB. Air interface resources are wasted as the transmit end retransmits the entire TB when only some CBs have errors. In view of this, a concept of a code block group (CBG) is put forward.

One CBG includes one or more code blocks. When any code block has an error, the receive end may feed back information about a code block group to which the code block belongs, to instruct the transmit end to retransmit code blocks in the code block group. In this way, the transmit end does not need to send an entire transport block, thereby saving air interface resources.

Although a CBG-related concept has been put forward, a specific implementation solution is still absent at present for division of code blocks into code block groups.

SUMMARY

This application provides a data processing method and a data processing apparatus, so as to divide code blocks into code block groups, thereby helping lower a bit error rate.

According to a first aspect, this application provides a data processing method. The data processing method includes: determining C code blocks, where C is a positive integer; and dividing the C code blocks into K code block groups, where an absolute value $\Delta C$ of a difference between quantities of code blocks included in any two of the K code block groups is less than or equal to a first threshold, and K is a positive integer.

In this data processing method, because the difference between the quantities of code blocks included in any two of the K code block groups into which the C code blocks are divided is less than a threshold, the C code blocks can be divided into the K code block groups as equally as possible. This helps make bit error performance of all code block groups close to each other, which in turn helps improve overall bit error performance of a transport block.

When K is 1, that is, when the C code blocks are divided into one code block group, the difference may be drawn between a quantity of code blocks included in the code block group and the quantity of code blocks included in the code block group itself.

With reference to the first aspect, in a first possible implementation, the first threshold is equal to 1.

When the first threshold is 1, a code block group may include no code block.

Optionally, the first threshold may be equal to 0. In that way, C code blocks are equally divided into K code block groups exactly. The first threshold equal to 1 is a division manner closest to equal division when the C code blocks cannot be equally divided into K code block groups.

With reference to the first aspect or the first possible implementation, in a second possible implementation, a quantity of code blocks included in each of the K code block groups is determined based on C and K.

To be specific, how many code blocks are included in one code block group may be determined based on the quantity C of to-be-divided code blocks and the quantity K of target code block groups, so that the C code blocks can be divided into K code block groups as equally as possible.

With reference to the second possible implementation, in a third possible implementation, each of $K_1$ code block groups in the K code block groups includes $C_1$ code blocks of the C code blocks, and each of $K_2$ code block groups in the K code block groups includes $C_2$ code blocks of the C code blocks, where $C_1$ and $C_2$ are determined based on $$C_1 = \left\lceil \frac{C}{K} \right\rceil$$

and $C_2 = C_1 - 1$, and $\lceil \ \rceil$ represents rounding up to an integer.

To be specific, when the C code blocks are divided into K code block groups, the K code block groups may be divided into two parts: one part is $K_1$ code block groups, and the other part is $K_2$ code block groups. Further, the C code blocks may be divided into two parts: One part is equally divided into $K_1$ code block groups, with each code block group including $C_1$ code blocks; and the other part is equally divided into $K_2$ code block groups, with each code block group including $C_2$ code blocks, where $C_1$ is greater than $C_2$ by 1. In this way, the C code blocks are divided into K code block groups in a manner close to equal division.

With reference to the second possible implementation, in a fourth possible implementation, each of $K_1$ code block groups in the K code block groups includes $C_1$ code blocks of the C code blocks, and each of $K_2$ code block groups in the K code block groups includes $C_2$ code blocks of the C code blocks, where $K_1$ and $K_2$ are determined based on $K_2 = K \times C_1 - C$ and $K_1 = K - K_2$.

With reference to any one of the first aspect and the possible implementations, in a fifth possible implementation, the data processing method is performed by the transmit end. In this case, the data processing method further includes: obtaining indication information, where the indication information is used to indicate a to-be-transmitted code block group in the K code block groups; and determining the to-be-transmitted code block in the C code blocks based on the indication information.

Specifically, the indication information about the to-be-transmitted code block group may be obtained by receiving indication information sent by a receive end or by obtaining indication information configured on the transmit end.

With reference to any one of the first aspect and the possible implementations, in a sixth possible implementation, the data processing method is performed by the receive end. In this case, the data processing method further includes: determining a to-be-transmitted code block group in the K code block groups, where the to-be-transmitted code block group includes a code block with a decoding error in the C code blocks; and sending indication information about the to-be-transmitted code block group.

To be specific, when encountering a decoding error or a decoding failure, the receive end determines to which code block group a code block with the decoding error or decoding failure belongs, and then sends indication information about the code block group to a transmit end, so that the transmit end can determine, based on the indication information, which code block group needs to be retransmitted, and further determine which code blocks need to be retransmitted.

With reference to any one of the first aspect and the possible implementations, in a seventh possible implementation, K is system-configured or obtained from system signaling.

According to a second aspect, this application provides a data processing apparatus. The data processing apparatus includes a first processing module and a second processing module. The first processing module is configured to determine C code blocks, where C is a positive integer. The second processing module is configured to divide C code blocks into K code block groups, where an absolute value $\Delta C$ of a difference between quantities of code blocks included in any two of the K code block groups is less than or equal to a first threshold, and K is a positive integer.

Optionally, the first processing module and the second processing module may be configured to perform the data processing method in any possible implementation of the first aspect.

According to a third aspect, this application provides a data processing apparatus. The data processing apparatus includes a processor. The processor is configured to execute code. When executing the code, the processor determines C code blocks, and divides the C code blocks into K code block groups, where C is a positive integer, an absolute value $\Delta C$ of a difference between quantities of code blocks included in any two of the K code block groups is less than or equal to a first threshold, and K is a positive integer.

Optionally, the processor may perform the data processing method in any possible implementation of the first aspect.

Optionally, the data processing apparatus may further include a memory, configured to store the code executed by the processor. The data processing apparatus may further include a receiver and a transmitter, configured to communicate with another device.

According to a fourth aspect, this application provides a computer-readable storage medium. The computer-readable storage medium stores program code for execution by a data processing apparatus, and the program code includes an instruction used to perform the data processing method in any one of the first aspect and the possible implementations of the first aspect.

According to a fifth aspect, this application provides a computer program product that includes an instruction. When the computer program product runs on a data processing apparatus, the data processing apparatus performs the data processing method in any one of the first aspect and the possible implementations of the first aspect.

DESCRIPTION OF EMBODIMENTS

The following describes technical solutions of this application with reference to the accompanying drawings.

Figure 1:
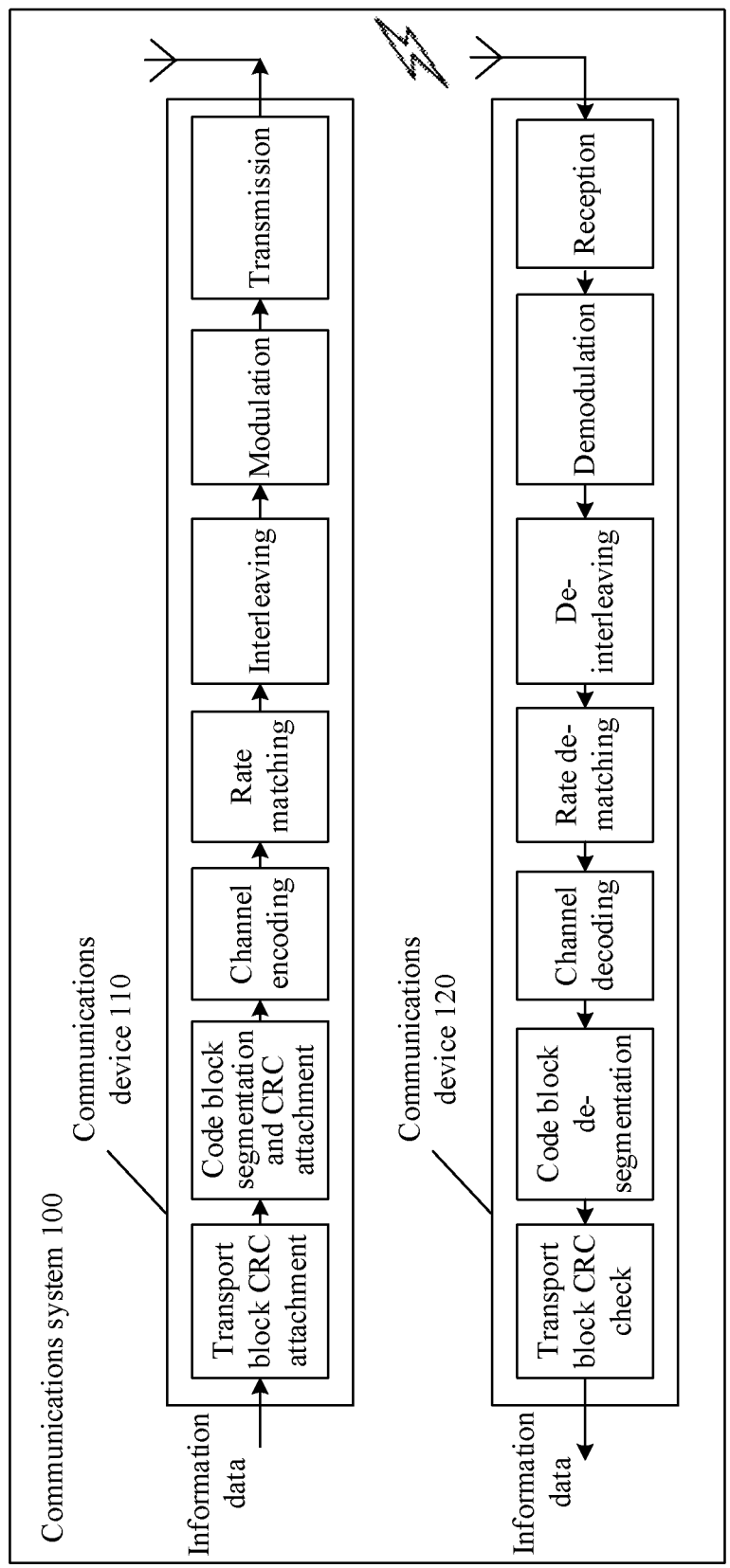
FIG. 1 is a schematic architectural diagram of a communications system to which a data processing method according to an embodiment of this application is applicable.

FIG. 1 is a schematic architectural diagram of an application scenario of the embodiments of this application. It should be understood that the embodiments of this application are not limited to the system architecture shown in FIG. 1. Moreover, an apparatus in FIG. 1 may be hardware, or software based on functional division, or a combination of both hardware and software.

A communications system 100 shown in FIG. 1 includes a communications device 110 and a communications device 120.

When sending information data, the communications device 110 may segment the information data into a plurality of transport blocks based on supported transport block sizes and attach CRC parity bits to each transport block. If a size of a transport block with CRC parity bits attached exceeds a maximum code block length, the transport block needs to be segmented into several code blocks. To each code block, cyclic redundancy check (CRC) parity bits may also be attached, and filler bits may also be inserted.

The communications device 110 can divide a transport block, or in other words, divide code blocks resulting from segmentation of a transport block, into code block groups (CBG). One CBG may include one or more code blocks. When any code block has an error, a receive end may feed back information about a code block group to which the code block belongs, to indicate a transmit end to retransmit code blocks in this code block group. In this way, the transmit end does not need to send the entire transport block, thereby saving air interface resources.

The communications device 110 performs channel encoding for each code block. For example, low density parity check codes (LDPC) are used for the encoding to obtain corresponding coded blocks. Each coded block includes a plurality of information bits and parity bits generated during the encoding, and the information bits and the parity bits are collectively referred to as encoded bits.

The coded blocks are stored in a circular buffer of the communications device 110 after interleaving of sub-blocks. The communications device 110 selects a segment of encoded bits from the circular buffer. That is, an encoded bit segment is interleaved and mapped to modulated symbols for transmission.

For retransmission, in a possible implementation, the communications device 110 selects another encoded bit segment from the circular buffer and sends the another encoded bit segment, and if all data in the circular buffer has been transmitted once, sends encoded bits again from the beginning of the circular buffer; in another possible manner, the communications device 110 performs the steps, such as segmentation into and encoding code blocks, again and then selects encoded bits to retransmit from the circular buffer based on a quantity of retransmissions and a redundancy version.

The communications device 120 demodulates and de-interleaves received modulated symbols, and then saves soft values of a received encoded bit segment at corresponding positions in a soft buffer.

The communications device 120 decodes the soft values in the soft buffer to obtain code blocks of information data. If the decoding is incorrect, the communications device 120 sends feedback information to the communications device 110, so that the communications device can perform retransmission in accordance with the feedback information.

If a retransmission occurs, the communications device 120 combines soft values of an encoded bit segment retransmitted every time and saves combined values in the soft buffer. The combination herein refers to combining soft values of encoded bits received in two times if the encoded bits are at the same positions. Then the communications device 120 decodes the soft values in the soft buffer.

It should be noted that in the embodiments of this application, the communications device 110 may be a network device, for example, a base station, in a communications system, and correspondingly the communications device 120 may be a terminal; or the communications device 110 may be a terminal, and correspondingly the communications device 120 may be a network device, for example, a base station. For ease of understanding, some nominal terms used in this application are described below.

In this application, the terms "network" and "system" are frequently interchangeably used, but their meanings can be understood by a person skilled in the art.

A terminal is a device provided with a communication function, and may include a hand-held device, an in-vehicle device, a wearable device, or a computing device that is provided with a function of wireless communication, a computing device, other processing devices connected to a wireless modem, or the like. Terminals may have different names in different networks, for example, user equipment, mobile station, subscriber unit, station, cellular phone, personal digital assistant, wireless modem, wireless communications device, hand-held device, laptop computer, cordless phone, and wireless local loop station. For ease of description, these devices are briefly referred to as terminals in this application.

A base station (BS), which may be referred to as a base station device, is a device that connects a terminal to a wireless network, and includes but is not limited to: a transmission/reception point (TRP), a next generation NodeB (Gnb), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a Wi-Fi access point (AP), and the like. Alternatively, base stations in other evolved networks may have other names. This is not limited in the present invention.

Figure 2:
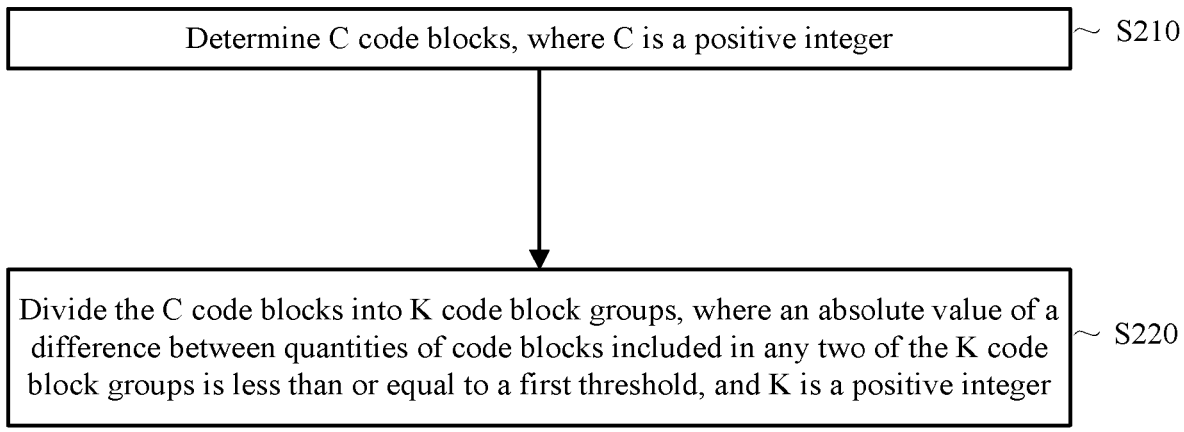
FIG. 2 is a schematic flowchart of a data processing method according to an embodiment of this application.

FIG. 2 is a schematic flowchart of a data processing method according to an embodiment of this application. The data processing method shown in FIG. 2 may be performed by a data processing apparatus. The data processing apparatus may be the communications device 110 or the communications device 120 in FIG. 1, or may be a part of the communications device 110 or the communications device 120.

It should be understood that FIG. 2 shows steps or operations of the data processing method, but these steps or operations are merely examples. Other operations or variations of the operations in FIG. 2 may also be performed in this embodiment of this application. In addition, the steps in FIG. 2 may be performed in an order different from that shown in FIG. 2, and it is possible that not all operations in FIG. 2 need to be performed.

S210: Determine C code blocks, where C is a positive integer.

The determining C code blocks in this step is determining or obtaining code blocks that need to be divided into code block groups. This step may be specifically segmenting a transport block to obtain C code blocks; or encoding code blocks resulting from segmentation of a transport block to obtain C coded blocks; or performing rate matching for each coded block to obtain C rate-matched coded blocks; or interleaving each coded block to obtain C interleaved coded blocks. Certainly, the code blocks to be divided into code block groups may be determined in other manners. This is not limited in this embodiment of this application.

Moreover, how many code block groups into which the to-be-divided code blocks need to be divided also needs to be determined. That is, a code block group quantity K needs to be determined. The code block group quantity K may be pre-configured by a system, may be obtained by the data processing apparatus from system signaling (or referred to as control signaling), or may be determined by the data processing apparatus based on other factors.

For example, K may be determined based on at least one of the following information: a size of a transport block, a maximum quantity of bits used by a receive end to feed back an acknowledgment, and a quantity of code block groups indicated by control signaling.

S220: Divide the C code blocks into K code block groups, where an absolute value $\Delta C$ of a difference between quantities of code blocks included in any two of the K code block groups is less than or equal to a first threshold, and K is a positive integer.

After the quantities of to-be-divided code blocks and code block groups are determined, the to-be-divided C code blocks may be divided into K code block groups. That is, which code blocks belong to one code block group is determined, or which code blocks are included in each code block group is determined.

Generally speaking, for the division into code block groups, the C code blocks should be divided into K code block groups as equally as possible. That is, all of the K code block groups resulting from division have an equal quantity of code blocks.

Equally dividing code blocks into code block groups helps save air interface resources when a transmit end retransmits code block groups. For example, it is assumed that one transport block includes 10,000 bits, the 10,000 bits are divided into four code blocks, and the four code blocks need to be divided into two code block groups. If the first code block group includes three code blocks and the second code block group includes one code block, the transmit end needs to retransmit all code blocks in the first code block group when any one code block in the first code block group has a decoding error. This wastes air interface resources. In addition, if bit error probabilities of all code blocks are close and an error probability of one code block group is much higher than error probabilities of the other code block group, an error probability of the entire transport block depends on the code block group with the higher error probability.

If the four code blocks are divided into two code block groups and the two code block groups each include two code blocks, the transmit end can retransmit only two code blocks irrespective of which code block has a decoding error, thereby saving air interface resources. Moreover, when error probabilities of both the code block groups are close, an error probability of the entire transport block is lower than that under unequal division.

The data processing apparatus may determine a quantity of code blocks included in each code block group based on the code block quantity C and the code block group quantity K. In other words, the quantity of code blocks included in each code block group may be determined based on the code block quantity C and the code block group quantity K.

For example, when the C code blocks can be equally divided into K code block groups, the quantity of code blocks that may be included in each code block group can be obtained based on $$\frac{C}{K}.$$

However, in most cases, it is likely that the C code blocks cannot be equally divided into K code block groups. Therefore, it may be considered that the C code blocks are equally divided into K code block groups when the absolute value ΔC of the difference between the quantities of code blocks included in any two of the K code block groups resulting from division is less than or equal to a threshold. In this embodiment of this application, this threshold is referred to as the first threshold. The first threshold may be 0 or any positive integer.

Usually, a value of the first threshold is required to be as small as possible because a smaller value of the first threshold means more equal division of the C code blocks into K code block groups. For example, the first threshold may be 1. That is, the difference between the quantities of code blocks included in any two of the K code block groups resulting from division of the C code blocks is less than or equal to 1.

One implementation of the dividing the C code blocks into K code block groups, where a difference between quantities of code blocks included in any two code block groups is less than or equal to 1, is: calculating $C_1$ and $C_2$ according to $$C_1 = \left\lceil \frac{C}{K} \right\rceil$$

and $C_2 = C_1 - 1$, where ⌈ ⌉ represents rounding up to an integer, and calculating $K_1$ and $K_2$; dividing some of the C code blocks into $K_1$ code block groups, each of which includes $C_1$ code blocks; and dividing the remaining code blocks of the C code blocks into $K_2$ code block groups, each of which includes $C_2$ code blocks. After $C_1$ and $C_2$ are obtained, $K_1$ and $K_2$ can be calculated according to $K_2 = K \times C_1 - C$ and $K_1 = K - K_2$.

One implementation of the dividing the C code blocks into K code block groups, where a difference between quantities of code blocks included in any two code block groups is less than or equal to 1, is: after $C_1$ and $C_2$ are obtained, calculating $K_1$ and $K_2$ according to $K_2 = K \times C_1 - C$ and $K_1 = K - K_2$; dividing some of the C code blocks into $K_1$ code block groups, each of which includes $C_1$ code blocks; and dividing the remaining code blocks of the C code blocks into $K_2$ code block groups, each of which includes $C_2$ code blocks.

$C_1$ is greater than $C_2$ by 1. That is, the first threshold is 1. In other words, the difference between the quantities of code blocks included in any two of the K code block groups is 1 or 0.

It should be noted that the code blocks included in the $K_1$ code block groups may be the first or the second part of code blocks in the C code blocks; and correspondingly, the code blocks included in the $K_2$ code block groups may be the second or the first part of code blocks in the C code blocks. In other words, the $K_1$ code block groups may be the first or the second part of code block groups in the K code block groups; and correspondingly, the $K_2$ code block groups may be the second or the first part of code block groups in the K code block groups.

The foregoing formulas used for obtaining $C_1$, $C_2$, $K_1$, and $K_2$ based on C and K are merely examples. Alternatively, $C_1$, $C_2$, $K_1$, and $K_2$ may be obtained based on K and C in other approaches. This is not limited in this embodiment of this application. For example, $$C_2 = \left\lfloor \frac{C}{K} \right\rfloor,$$

$C_1 = C_2 + 1$, $K_2 = K \times C_1 - C$, and $K_1 = K - K_2$, where ⌊ ⌋ represents rounding down to an integer.

Optionally, this method may be performed by a transmit end of data or a data processing apparatus on a transmit end; or performed by a receive end of data or a data processing apparatus on a receive end. For example, the method may be performed by either the communications device 110 or the communications device 120 in FIG. 1.

If the method shown in FIG. 2 is performed by a receive end, the receive end may further determine, based on the division of code block groups, which code block group a code block with a decoding error belongs to. In this embodiment of this application, a code block group to which a code block with a decoding error belongs is referred to as a to-be-transmitted code block group.

Specifically, when determining which code block group a code block C' with a decoding error belongs to, the receive end may first determine a total code block quantity C and a total code block group quantity K, and then perform the following procedures.

(1) $C_1$, $C_2$, $K_1$, and $K_2$ are calculated according to $$C_1 = \left\lceil \frac{C}{K} \right\rceil,$$

$C_2 = C_1 - 1$, $K_2 = K \times C_1 - C$, and $K_1 = K - K_2$.

It is assumed that the first part of code blocks in the C code blocks is divided into the first $K_1$ code block groups of the K code block groups, and that the second part of code blocks in the C code blocks is divided into the last $K_2$ code block groups of the K code block groups.

(2) If $C' < K_1 \times C_1$, it can be learned according to $$K' = \left\lfloor \frac{C'}{C_1} \right\rfloor$$

that the code block C' with a decoding error belongs to the $(K')^{th}$ code block group.

Therefore, the $(K')^{th}$ code block group of the K code block groups is a to-be-transmitted code block group. Herein, code blocks are counted starting from 0, and code block groups are counted starting from 0.

(3) If $C' \geq K_1 \times C_1$, this is learned according to $$K' = K_1 + \left\lfloor \frac{C - C_1 \times K_1}{C_2} \right\rfloor.$$

Herein, code blocks are counted starting from 0, and code block groups are counted starting from 0.

In the procedure (1), it may also be assumed that the first part of code blocks in the C code blocks is divided into the first $K_2$ code block groups of the K code block groups, and that the second part of code blocks in the C code blocks is divided into the last $K_1$ code block groups of the K code block groups. In this case, $K_1$ and $K_2$ in the procedure (2) and the procedure (3) are interchanged, and $C_1$ and $C_2$ in the procedure (2) and the procedure (3) are interchanged.

After determining the to-be-transmitted code block group, the receive end may send indication information about the to-be-transmitted code block group to a transmit end to inform the transmit end which code block group needs to be retransmitted, that is, to inform the transmit end which code blocks need to be retransmitted. For example, the receive end may indicate the to-be-transmitted code block group in an indicator-blinking manner.

In general, a data processing apparatus on the receive end may first determine the code block quantity C and the code block group quantity K, and determine which code block has encountered a decoding error; then determine how the C code blocks are divided into the K code block groups based on the code block quantity C and the code block group quantity K; and then determine, based on the division result, which code block group the code block with a decoding error belongs to; and finally send indication information to indicate which code block group the code block with a decoding error belongs to.

If the method shown in FIG. 2 is performed by a transmit end, the transmit end may, after dividing the C code blocks into the K code block groups, determine code blocks included in a to-be-transmitted code block group based on the division result and indication information about the to-be-transmitted code block group, and send the code blocks to a receive end.

Specifically, when determining which code blocks are included in the to-be-transmitted code block group, that is, to which code block groups to-be-transmitted code blocks belong, the transmit end may first determine, based on the indication information, that the to-be-transmitted code block groups in the K code block groups are totally i code block groups, the $(K^0)^{th}$, $(K^1)^{th}$, ..., and $(K^i)^{th}$ code block groups, where i is a positive integer; and then determine which code blocks are included in any code block group K' of the $K^i$ code block groups by performing the following procedures.

(4) $C_1$, $C_2$, $K_1$, and $K_2$ are calculated according to $$C_1 = \left\lceil \frac{C}{K} \right\rceil,$$

$C_2 = C_1 - 1$, $K_2 = K \times C_1 - C$, and $K_1 = K - K_2$.

It is assumed that the first part of code blocks in the C code blocks is divided into the first $K_1$ code block groups of the K code block groups, and that the second part of code blocks in the C code blocks is divided into the last $K_2$ code block groups of the K code block groups.

(5) If $K' < K_1$, the to-be-transmitted code blocks are the $(K' \times C_1)^{th}$ code block to the $((K'+1) \times C_1 - 1)^{th}$ code block in the C code blocks. Herein, code block groups and code blocks are both counted starting from 0.

(6) If $K' \geq K_1$, the to-be-transmitted code blocks are the $((C_1 \times K_1) + (K' - K_1) \times C_2)^{th}$ code block to the $((C_1 \times K_1) \pm (K' - K_1 + 1) \times C_2 - 1)^{th}$ code block in the C code blocks. Herein, code block groups and code blocks are both counted starting from 0.

In the procedure (4), it may also be assumed that the first part of code blocks in the C code blocks is divided into the first $K_2$ code block groups of the K code block groups, and that the second part of code blocks in the C code blocks is divided into the last $K_1$ code block groups of the K code block groups. In this case, $K_1$ and $K_2$ in the procedure (5) and the procedure (6) are interchanged, and $C_1$ and $C_2$ in the procedure (5) and the procedure (6) are interchanged.

Another possible implementation for determining which code blocks are included in the code block group K' includes: All code blocks are traversed in turn and the procedures (1) to (3) are performed to determine a sequence number of a code block group to which a code block C' belongs when the traversal proceeds to the code block C'; if it is determined that the obtained code block group sequence number equals K', it indicates that the code block group K' includes the code block C'; which code blocks belong to the code block group K' can be determined when all code blocks are traversed, and then the code block group K' is obtained.

After determining the to-be-transmitted code block group, the transmit end may send the to-be-transmitted code block group to the receive end, or in other words send the code blocks included in the to-be-transmitted code block group. The determined to-be-transmitted code block group may be one or more code block groups.

In general, a data processing apparatus on the transmit end may first determine the code block quantity C and the code block group quantity K, and determine which code block group is the to-be-transmitted code block group; then determine how the C code blocks are divided into the K code block groups based on the code block quantity C and the code block group quantity K; and then determine which code blocks are included in the to-be-transmitted code block group based on the division result; and finally send the determined code blocks.

In a case of initial transmission by the transmit end, the indication information may be system-configured. In this case, the to-be-transmitted code block group is the K code block groups and the to-be-transmitted code blocks are the C code blocks. In a case of retransmission by the transmit end, the indication information may be received by the transmit end from the receive end.

Figure 3:
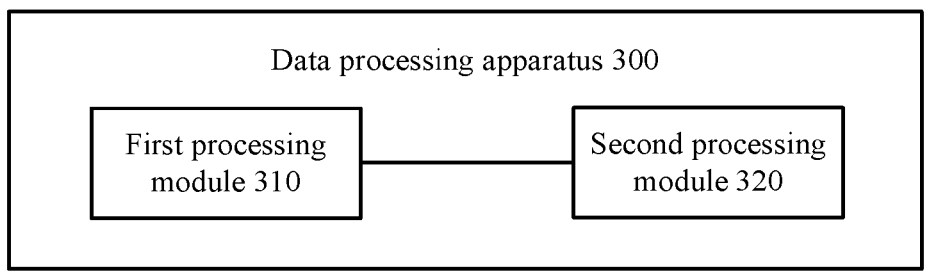
FIG. 3 is a schematic structural diagram of a data processing apparatus according to an embodiment of this application.

FIG. 3 is a schematic structural diagram of a data processing apparatus according to an embodiment of this application. It should be understood that the data processing apparatus 300 shown in FIG. 3 is merely an example. The data processing apparatus in this embodiment of this application may further include other modules or units, or include modules having functions similar to those of modules in FIG. 3, or may not necessarily include all modules in FIG. 3.

A first processing module 310 is configured to determine C code blocks, where C is a positive integer.

A second processing module 320 is configured to divide the C code blocks into K code block groups, where an absolute value ΔC of a difference between quantities of code blocks included in any two of the K code block groups is less than or equal to a first threshold, and K is a positive integer.

In this data processing apparatus, because the difference between the quantities of code blocks included in any two of the K code block groups into which the C code blocks are divided is less than a threshold, the C code blocks can be divided into the K code block groups as equally as possible. This helps make bit error performance of all code block groups close to each other, thereby ensuring good overall bit error performance of a transport block.

Optionally, the first threshold may be equal to 1.

Optionally, a quantity of code blocks included in each of the K code block groups may be determined based on C and K.

Optionally, each of $K_1$ code block groups in the K code block groups includes $C_1$ code blocks of the C code blocks, and each of $K_2$ code block groups in the K code block groups includes $C_2$ code blocks of the C code blocks, where $C_1$ and $C_2$ are determined based on $$C_1 = \left\lceil \frac{C}{K} \right\rceil$$

and $C_2=C_1-1$, and $\lceil\ \rceil$ represents rounding up to an integer.

Optionally, each of $K_1$ code block groups in the K code block groups includes $C_1$ code blocks of the C code blocks, and each of $K_2$ code block groups in the K code block groups includes $C_2$ code blocks of the C code blocks, where $K_1$ and $K_2$ are determined based on $K_2=K\times C_1-C$ and $K_1=K-K_2$.

Optionally, the data processing apparatus may be a transmit end of the C code blocks. Correspondingly, the data processing apparatus further includes a third processing module, configured to obtain indication information, where the indication information is used to indicate a to-be-transmitted code block group in the K code block groups; the second processing module is further configured to determine the to-be-transmitted code block group in the K code block groups based on the indication information.

Optionally, the data processing apparatus may be a receive end of the C code blocks. Correspondingly, the second processing module is further configured to determine a to-be-transmitted code block group in the K code block groups, where the to-be-transmitted code block group includes a code block with a decoding error in the C code blocks. In this case, the data processing apparatus may further include a third processing module, where the third processing module is configured to send indication information about the to-be-transmitted code block group.

Optionally, K may be system-configured or obtained from system signaling.

The data processing apparatus shown in FIG. 3 may perform the steps in the data processing method shown in FIG. 2. For brevity, details are not described herein again.

Figure 4:
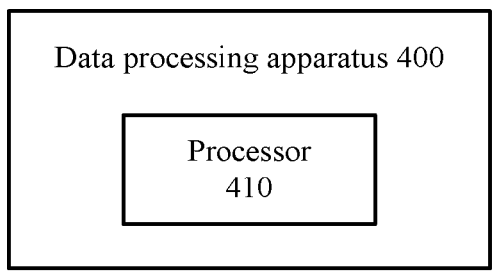
FIG. 4 is a schematic structural diagram of a data processing apparatus according to an embodiment of this application.

FIG. 4 is a schematic structural diagram of a data processing apparatus according to another embodiment of this application. It should be understood that the data processing apparatus 400 shown in FIG. 4 is merely an example. The data processing apparatus in this embodiment of this application may further include other modules or units, or include modules having functions similar to those of modules in FIG. 4. The data processing apparatus 400 may include one or more processors 410.

The processor 410 may be configured to perform the operations or steps that can be performed by the first processing module 310 and the second processing module 320 in FIG. 3. Optionally, the processor 410 may be further configured to perform the operations or steps that can be performed by the third processing module included in the data processing apparatus 300.

The data processing apparatus shown in FIG. 4 may further include a receiver and a transmitter, configured to communicate with other devices. The receiver and the transmitter may be integrated into a transceiver.

The data processing apparatus shown in FIG. 4 may also include one or more memories, configured to store program code for execution by the processor. The processor 410 may integrate a memory or be coupled to the one or more memories, and is configured to invoke an instruction in the memory to perform the steps described in the foregoing method embodiment.

A person of ordinary skill in the art may be aware that, the units and algorithm steps in the examples described with reference to the embodiments disclosed in this specification may be performed by electronic hardware or a combination of computer software and electronic hardware. Whether the functions are implemented by hardware or software depends on particular applications and design constraints of the technical solutions. A person skilled in the art may use different methods to implement the described functions for different particular applications, but it should not be considered that the implementation has gone beyond the scope of this application.

It may be clearly understood by a person skilled in the art that, for the purpose of convenient and brief description, for a detailed working process of the foregoing system, apparatus, or unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, comprising:
   determining a quantity C of code blocks of a transport block and a quantity K of code block groups of the transport block; and
   determining, based on the quantity C of code blocks of the transport block and the quantity K of code block groups of the transport block, code blocks comprised in a code block group K', wherein quantities of code blocks comprised in any two of the K code block groups are equal or have a difference of 1;
   wherein each of the first $K_1$ code block groups in the K code block groups of the transport block comprises $$\left\lceil \frac{C}{K} \right\rceil$$

code blocks in C code blocks of the transport block, and each of the last $K_2$ code block groups in the K code block groups of the transport block comprises $$\left\lfloor \frac{C}{K} \right\rfloor$$

code blocks in the C code blocks, wherein $K_1$ and $K_2$ satisfy a relation $K_1+K_2=K$, and $K_2$ satisfies a relation $$K_2 = K \times \left\lceil \frac{C}{K} \right\rceil - C.$$

2. The method according to claim 1, wherein the code block group K' in the first $K_1$ code block groups comprises the $$\left( K' \times \left\lceil \frac{C}{K} \right\rceil \right)^{th}$$

code block to the $$\left( (K'+1) \times \left\lceil \frac{C}{K} \right\rceil - 1 \right)^{th}$$

code block in the C code blocks, wherein $0 \leq K' < K_1$.

3. The method according to claim 1, wherein the code block group K' in the last $K_2$ code block groups comprises the $$\left( \left\lceil \frac{C}{K} \right\rceil \times K_1 \right) + (K' - K_1) \times \left\lfloor \frac{C}{K} \right\rfloor \right)^{th}$$

code block to the $$\left( \left\lceil \frac{C}{K} \right\rceil \times K_1 + (K' - K_1 + 1) \times \left\lfloor \frac{C}{K} \right\rfloor - 1 \right)^{th}$$

code block in the C code blocks, wherein $K_1 \leq K' < K$.

4. The method according to claim 1, wherein the method further comprises:
   receiving indication information, wherein the indication information is used to indicate the code block group K' as a to-be-transmitted code block group; and
   sending the code blocks in the code block group K'.

5. The method according to claim 1, wherein when the C code blocks are equally divided into K code block groups, each of the K code block groups comprises $$\frac{C}{K}$$

code blocks in the C code blocks.

6. The method according to claim 1, wherein K is obtained from system signaling.

7. A data processing apparatus, comprising:
   one or more memories configured to store program instructions; and
   one or more processors coupled to the one or more memories and configured to execute the program instructions;
   wherein execution of the program instructions by the one or more processors cause the apparatus to:
   determine a quantity C of code blocks of a transport block and a quantity K of code block groups of the transport block; and
   determine code blocks comprised in a code block group K' based on the quantity C of code blocks of the transport block and the quantity K of code block groups of the transport block, wherein quantities of code blocks comprised in any two of the K code block groups are equal or have a difference of 1;
   wherein each of the first $K_1$ code block groups in the K code block groups of the transport block comprises $$\left\lceil \frac{C}{K} \right\rceil$$

code blocks in C code blocks of the transport block, and each of the last $K_2$ code block groups in the K code block groups of the transport block comprises $$\left\lfloor \frac{C}{K} \right\rfloor$$

code blocks in the C code blocks, wherein $K_1$ and $K_2$ satisfy a relation $K_1+K_2=K$, and $K_2$ satisfies a relation $$K_2 = K \times \left\lceil \frac{C}{K} \right\rceil - C.$$

8. The apparatus according to claim 7, wherein the code block group K' in first $K_1$ code block groups comprises the $$\left( K' \times \left\lceil \frac{C}{K} \right\rceil \right)^{th}$$

code block to the $$\left( (K'+1) \times \left\lceil \frac{C}{K} \right\rceil - 1 \right)^{th}$$

code block in the C code blocks, wherein $0 \le K' < K_1$.

9. The apparatus according to claim 7, wherein the code block group K' in the last $K_2$ code block groups comprises the $$\left( \left( \left\lceil \frac{C}{K} \right\rceil \times K_1 \right) + (K' - K_1) \times \left\lfloor \frac{C}{K} \right\rfloor \right)^{th}$$

code block to the $$\left( \left\lceil \frac{C}{K} \right\rceil \times K_1 + (K' - K_1 + 1) \times \left\lfloor \frac{C}{K} \right\rfloor - 1 \right)^{th}$$

code block in the C code blocks, wherein $K_1 \le K' < K$.

10. The apparatus according to claim 7, wherein the apparatus further comprises a transceiver, wherein the transceiver is configured to:
receive indication information, wherein the indication information is used to indicate the code block group K' as a to-be-transmitted code block group; and
send the code blocks in the code block group K'.

11. The apparatus according to claim 7, wherein when the C code blocks are equally divided into K code block groups, each of the K code block groups comprises $$\frac{C}{K}$$

code blocks in the C code blocks.

12. The apparatus according to claim 7, wherein K is obtained from system signaling.

13. The apparatus according to claim 7, wherein the apparatus is a network device or a terminal.

14. A non-transitory computer readable storage medium comprising an instruction stored thereon which, when run on a computer, cause the computer to perform operations comprising:
determining a quantity C of code blocks of a transport block and a quantity K of code block groups of the transport block; and
determining, based on the quantity C of code blocks of the transport block and the quantity K of code block groups of the transport block, code blocks comprised in a code block group K', wherein quantities of code blocks comprised in any two of the K code block groups are equal or have a difference of 1;
wherein each of the first $K_1$ code block groups in the K code block groups of the transport block comprises $$\left\lceil \frac{C}{K} \right\rceil$$

code blocks in C code blocks of the transport block, and each of the last $K_2$ code block groups in the K code block groups of the transport block comprises $$\left\lfloor \frac{C}{K} \right\rfloor$$

code blocks in the C code blocks, wherein $K_1$ and $K_2$ satisfy a relation $K_1+K_2=K$, and $K_2$ satisfies a relation $$K_2 = K \times \left\lceil \frac{C}{K} \right\rceil - C.$$

15. The non-transitory computer readable storage medium according to claim 14, wherein the code block group K' in first $K_1$ code block groups comprises the $$\left( K' \times \left\lceil \frac{C}{K} \right\rceil \right)^{th}$$

code block to the $$\left( (K'+1) \times \left\lceil \frac{C}{K} \right\rceil - 1 \right)^{th}$$

code block in the C code blocks, wherein $0 \le K' < K_1$.

16. The non-transitory computer readable storage medium according to claim 14, wherein the code block group K' in the last $K_2$ code block groups comprises the $$\left( \left( \left\lceil \frac{C}{K} \right\rceil \times K_1 \right) + (K' - K_1) \times \left\lfloor \frac{C}{K} \right\rfloor \right)^{th}$$

code block to the $$\left( \left\lceil \frac{C}{K} \right\rceil \times K_1 + (K' - K_1 + 1) \times \left\lfloor \frac{C}{K} \right\rfloor - 1 \right)^{th}$$

code block in the C code blocks, wherein $K_1 \le K' < K$.

17. The non-transitory computer readable storage medium according to claim 14, wherein the operations further comprises:
    receiving indication information, wherein the indication information is used to indicate the code block group K' as a to-be-transmitted code block group; and
    sending the code blocks in the code block group K'.

\* \* \* \* \*

UNITED STATES PATENT AND TRADEMARK OFFICE
CERTIFICATE OF CORRECTION

PATENT NO. : 11,239,957 B2
APPLICATION NO. : 16/665750
DATED : February 1, 2022
INVENTOR(S) : Ma et al.

Page 1 of 1

It is certified that error appears in the above-identified patent and that said Letters Patent is hereby corrected as shown below:

On the Title Page

Item [56], Line 1: "Overview of CBG-based retransmission in NR," 3GPPTSG RAN" should read
-- Overview of CBG-based retransmission in NR," 3GPP TSG RAN --.

In the Claims

Claim 17: Column 17, Line 2: "according to claim 14, wherein the operations further comprises:"
should read -- according to claim 14, wherein the operations further comprise: --.

Signed and Sealed this
Tenth Day of May, 2022

Katherine Kelly Vidal
*Director of the United States Patent and Trademark Office*